United States Patent
Matsukuma et al.

(10) Patent No.: US 9,545,722 B2
(45) Date of Patent: Jan. 17, 2017

(54) ROBOT SYSTEM, ROBOT MONITORING DEVICE, AND ROBOT MONITORING METHOD

(71) Applicant: KABUSHIKI KAISHA YASKAWA DENKI, Kitakyushu-shi (JP)

(72) Inventors: Kenji Matsukuma, Fukuoka (JP); Makoto Umeno, Fukuoka (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 14/636,181

(22) Filed: Mar. 3, 2015

(65) Prior Publication Data
US 2015/0251317 A1 Sep. 10, 2015

(30) Foreign Application Priority Data
Mar. 5, 2014 (JP) ................................. 2014-042854

(51) Int. Cl.
*B25J 9/16* (2006.01)
*B25J 13/08* (2006.01)

(52) U.S. Cl.
CPC ............. *B25J 9/1697* (2013.01); *B25J 9/1676* (2013.01); *B25J 13/08* (2013.01); *G05B 2219/31447* (2013.01); *G05B 2219/40216* (2013.01); *Y10S 901/47* (2013.01)

(58) Field of Classification Search
CPC ......... B25J 9/1697; B25J 9/1676; B25J 13/08; B25J 19/00; B25J 19/0095; B25J 19/02; B25J 19/021; B25J 19/023; B25J 19/04
See application file for complete search history.

(56) References Cited

U.S. PATENT DOCUMENTS

| | | | | |
|---|---|---|---|---|
| 4,553,077 A | * | 11/1985 | Brantmark | G05B 19/427 219/125.1 |
| 4,837,487 A | * | 6/1989 | Kurakake | B25J 19/021 318/568.16 |
| 5,066,902 A | * | 11/1991 | Watanabe | B25J 9/1697 318/568.1 |
| 8,082,673 B2 | * | 12/2011 | Desforges | B25J 9/1692 33/503 |

(Continued)

FOREIGN PATENT DOCUMENTS

| | | |
|---|---|---|
| CN | 102161202 | 8/2011 |
| CN | 102768517 | 11/2012 |

(Continued)

OTHER PUBLICATIONS

Extended European Search Report for corresponding EP Application No. 15157116.3-1807, Jul. 13, 2015.

(Continued)

*Primary Examiner* — Nicholas Kiswanto
(74) *Attorney, Agent, or Firm* — Mori & Ward, LLP

(57) ABSTRACT

A robot system, includes: a robot; a camera configured to capture an image of operation of the robot; and a circuit configured to: control the robot so as to perform work in accordance with work contents information preliminarily stored to indicate a series of work contents; save image information captured by the camera during work performance by the robot in association with time information; and display the saved image information together with the time information.

18 Claims, 16 Drawing Sheets

(56) References Cited

U.S. PATENT DOCUMENTS

| | | | |
|---|---|---|---|
| 2004/0104702 A1* | 6/2004 | Nakadai | B25J 13/00 318/568.12 |
| 2004/0138783 A1* | 7/2004 | Watanabe | B25J 9/1674 700/259 |
| 2013/0238131 A1 | 9/2013 | Kondo et al. | |
| 2015/0202777 A1 | 7/2015 | Kondo et al. | |

FOREIGN PATENT DOCUMENTS

| | | |
|---|---|---|
| CN | 103302664 | 9/2013 |
| EP | 1424173 | 6/2004 |
| EP | 02793183 | 10/2014 |
| JP | 10-049209 | 2/1998 |
| JP | 2004-174662 | 6/2004 |
| JP | 2012-187641 | 10/2012 |
| JP | 2013-097514 | 5/2013 |
| WO | WO 2013/065332 | 5/2013 |

OTHER PUBLICATIONS

Japanese Office Action for corresponding JP Application No. 2014-042854, Jan. 26, 2016.
Chinese Office Action for corresponding CN Application No. 201510094506.8, Feb. 19, 2016.

* cited by examiner

Fig.8

| WORK ID | WORK CONTENTS (MAIN CATEGORY) | WORK CONTENTS (SUB CATEGORY) |
|---|---|---|
| W1 | MOVE PETRI DISH 121 | |
| W11 | | GRIP GRIPPING PORTION 123 OF HOLDER 122 |
| W12 | | GRIP PETRI DISH 121 HOUSED IN INCUBATOR |
| W13 | | REMOVE PETRI DISH 121 FROM INCUBATOR |
| W14 | | PLACE REMOVED PETRI DISH 121 ON PETRI DISH STAGE 125 |
| W2 | OPEN COVER 121U OF PETRI DISH 121 | |
| W21 | | GRIP GRIPPING PORTION 128 OF HOLDER 127 |
| W22 | | SUCTION AND LIFT COVER 121U OF PETRI DISH 121 |
| W3 | PERFORM TREATMENT BY USING PIPETTE 129 | |
| W31 | | GRIP GRIPPING PORTION 132 OF HOLDER 131 |
| W32 | | ATTACH CHIP TO TIP OF PIPETTE 129 |
| W33 | | OPERATE PUSH BUTTON 133 AND SUCTION REAGENT VIA CHIP |
| W34 | | INJECT SUCTIONED REAGENT TO BOTTOM SAUCER 134 OF PETRI DISH 121 |
| W35 | | MOVE HAND 111R BELOW TABLE |
| W36 | | REMOVE USED CHIP FROM TIP OF PIPETTE 129 |
| W37 | | DISPOSE OF USED CHIP IN DISPOSAL BOX |
| W4 | PERFORM TREATMENT BY USING PADDLE 135 | |
| W41 | | GRIP GRIPPING PORTION 137 OF HOLDER 136 |
| W42 | | STIR SPECIMEN INSIDE BOTTOM SAUCER 134 OF PETRI DISH 121 BY MANIPULATING PADDLE 135 |
| W43 | | MOVE HAND 111L BELOW TABLE |
| W44 | | DISPOSE OF USED PADDLE 135 IN DISPOSAL BOX |
| W5 | OPEN COVER OF TEST TUBE | |
| ⋮ | | ⋮ |
| W6 | SUCTION SUPERNATANT SOLUTION INSIDE BOTTOM SAUCER 134 OF PETRI DISH 121 BY USING PIPETTE 129 | |
| ⋮ | | ⋮ |
| W7 | INJECT SUPERNATANT SOLUTION INTO TEST TUBE | |
| ⋮ | | ⋮ |
| W8 | CLOSE COVER OF TEST TUBE | |
| ⋮ | | ⋮ |
| W9 | HEAT OR COOL TEST TUBE WITH HEATER/COOLER | |
| ⋮ | | ⋮ |
| W10 | CENTRIFUGE AND SEPARATE SPECIMEN IN TEST TUBE BY USING CENTRIFUGAL SEPARATOR | |
| ⋮ | | ⋮ |

Fig.9

| WORK ID | WORK ACCOMPLISHMENT TIME | WORK ACCOMPLISHMENT RESULT |
|---|---|---|
| W1 | 0:00:00~0:00:20 | OK |
| W11 | 0:00:00~0:00:05 | OK |
| W12 | 0:00:05~0:00:10 | OK |
| W13 | 0:00:10~0:00:15 | OK |
| W14 | 0:00:15~0:00:20 | OK |
| W2 | 0:00:20~0:00:30 | OK |
| W21 | 0:00:20~0:00:25 | OK |
| W22 | 0:00:25~0:00:30 | OK |
| W3 | 0:00:30~0:01:05 | OK |
| W31 | 0:00:30~0:00:35 | OK |
| W32 | 0:00:35~0:00:40 | OK |
| W33 | 0:00:40~0:00:45 | OK |
| W34 | 0:00:45~0:00:50 | OK |
| W35 | 0:00:50~0:00:55 | OK |
| W36 | 0:00:55~0:01:00 | OK |
| W37 | 0:01:00~0:01:05 | OK |
| W4 | 0:01:05~0:01:25 | NG |
| W41 | 0:01:05~0:01:10 | OK |
| W42 | 0:01:10~0:01:15 | NG |
| W43 | 0:01:15~0:01:20 | OK |
| W44 | 0:01:20~0:01:25 | OK |
| W5 | 0:01:25~0:01:40 | OK |
| ⋮ | ⋮ | ⋮ |
| W6 | 0:01:40~0:02:00 | OK |
| ⋮ | ⋮ | ⋮ |
| W7 | 0:02:00~0:02:30 | NG |
| ⋮ | ⋮ | ⋮ |
| W8 | 0:02:30~0:02:40 | OK |
| ⋮ | ⋮ | ⋮ |
| W9 | 0:02:40~0:03:00 | OK |
| ⋮ | ⋮ | ⋮ |
| W10 | 0:03:00~0:04:00 | OK |
| ⋮ | ⋮ | ⋮ |

Fig.10

| IMAGE ID | IMAGE CAPTURED TIME | WORK ID |
|---|---|---|
| V1 | 0:00:00~0:00:20 | W1 |
| | 0:00:00~0:00:05 | W11 |
| | 0:00:05~0:00:10 | W12 |
| | 0:00:10~0:00:15 | W13 |
| | 0:00:15~0:00:20 | W14 |
| | 0:00:20~0:00:30 | W2 |
| | 0:00:20~0:00:25 | W21 |
| | 0:00:25~0:00:30 | W22 |
| | 0:00:30~0:01:05 | W3 |
| | 0:00:30~0:00:35 | W31 |
| | 0:00:35~0:00:40 | W32 |
| | 0:00:40~0:00:45 | W33 |
| | 0:00:45~0:00:50 | W34 |
| | 0:00:50~0:00:55 | W35 |
| | 0:00:55~0:01:00 | W36 |
| | 0:01:00~0:01:05 | W37 |
| | 0:01:05~0:01:25 | W4 |
| | 0:01:05~0:01:10 | W41 |
| | 0:01:10~0:01:15 | W42 |
| | 0:01:15~0:01:20 | W43 |
| | 0:01:20~0:01:25 | W44 |
| | 0:01:25~0:01:40 | W5 |
| | ⋮ | ⋮ |
| | 0:01:40~0:02:00 | W6 |
| | ⋮ | ⋮ |
| | 0:02:00~0:02:30 | W7 |
| | ⋮ | ⋮ |
| | 0:02:30~0:02:40 | W8 |
| | ⋮ | ⋮ |
| | 0:02:40~0:03:00 | W9 |
| | ⋮ | ⋮ |
| | 0:03:00~0:04:00 | W10 |
| | ⋮ | ⋮ |

Fig. 13A
WORK CONTENTS BEFORE CORRECTION

| WORK ID | WORK CONTENTS (MAIN CATEGORY) | WORK CONTENTS (SUB CATEGORY) |
|---|---|---|
| W4 | PERFORM TREATMENT BY USING PADDLE 135 | |
| W41 | | GRIP GRIPPING PORTION 137 OF HOLDER 136 |
| W42 | | STIR SPECIMEN INSIDE BOTTOM SAUCER 134 OF PETRI DISH 121 BY MANIPULATING PADDLE 135 |
| W43 | | MOVE HAND 111L BELOW TABLE |
| W44 | | DISPOSE OF USED PADDLE 135 IN DISPOSAL BOX |

Fig. 13B
WORK CONTENTS AFTER CORRECTION

| WORK ID | WORK CONTENTS (MAIN CATEGORY) | WORK CONTENTS (SUB CATEGORY) |
|---|---|---|
| W4 | PERFORM TREATMENT BY USING LONG PADDLE | |
| W41 | | GRIP GRIPPING PORTION OF HOLDER |
| W42 | | STIR SPECIMEN INSIDE BOTTOM SAUCER 134 OF PETRI DISH 121 BY MANIPULATING LONG PADDLE |
| W43 | | MOVE HAND 111L BELOW TABLE |
| W44 | | DISPOSE OF USED LONG PADDLE IN DISPOSAL BOX |

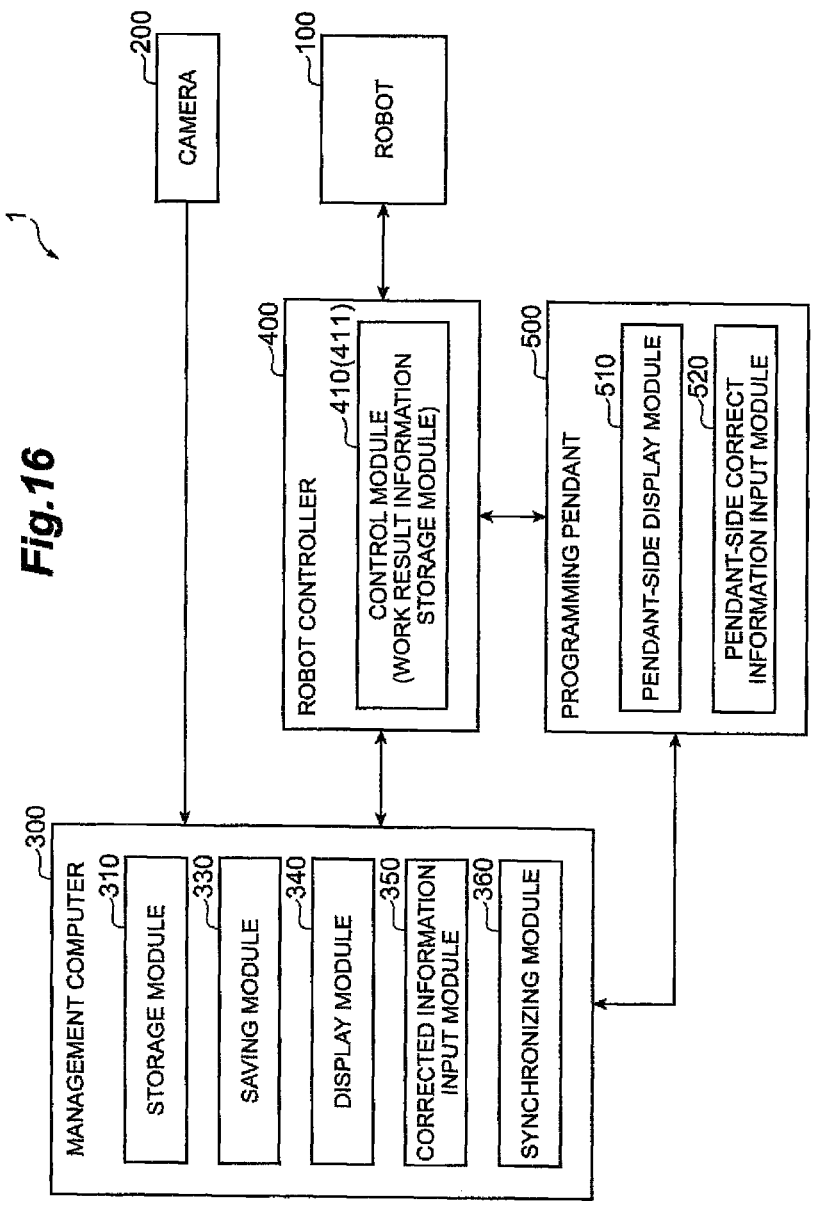

ROBOT SYSTEM, ROBOT MONITORING DEVICE, AND ROBOT MONITORING METHOD

CROSS-REFERENCE TO RELATED APPLICATION

This application is based upon and claims the benefit of priority from Japanese Patent Application No. 2014-042854, filed Mar. 5, 2014, the entire contents of which are incorporated herein by reference.

BACKGROUND

1. Field

The present disclosure relates to a robot system, a robot monitoring device, and a robot monitoring method.

2. Description of the Related Art

JP 2012-187641 A discloses a device that monitors, for example, operation of a robot.

SUMMARY

A robot system according to the present disclosure includes: a robot; an imaging device configured to capture an image of operation of the robot; and a circuit configured to: control the robot so as to perform work in accordance with work contents information preliminarily stored to indicate a series of work contents; save image information captured by the imaging device during work performance by the robot in association with time information; and display the saved image information together with the time information. Here, the "time information" is not limited to general standard time and represents a broad concept of time, such as a time having passed from when the work is started by the robot, or a time having passed from display of the image information.

Further, a robot monitoring device according to the present disclosure includes: a control module configured to control a robot so as to perform work in accordance with work contents information preliminarily stored to indicate a series of work contents; a saving module configured to save image information captured by an imaging device during work performance by the robot in association with time information; and a display module configured to display the image information saved by the saving module together with the time information.

Further, a robot monitoring method according to the present disclosure includes steps of: controlling a robot so as to perform work in accordance with work contents information preliminarily stored to indicate a series of work contents; saving image information captured by an imaging device during work performance by the robot in association with time information; and displaying the image information saved in the saving step together with the time information.

BRIEF DESCRIPTION OF THE DRAWINGS

FIG. 8 is a diagram illustrating an image of exemplary work contents information stored by a storage module 310.

FIG. 9 is a diagram illustrating an image of exemplary work result information stored by a work result information storage module 321.

FIG. 10 is a diagram illustrating an image of exemplary information stored by a saving module 330.

FIGS. 13A and 13B are diagrams illustrating images of exemplary operation in a correct information input module 350.

FIG. 16 is a diagram illustrating another different schematic configuration of the robot system 1.

DETAILED DESCRIPTION

Figure 1:
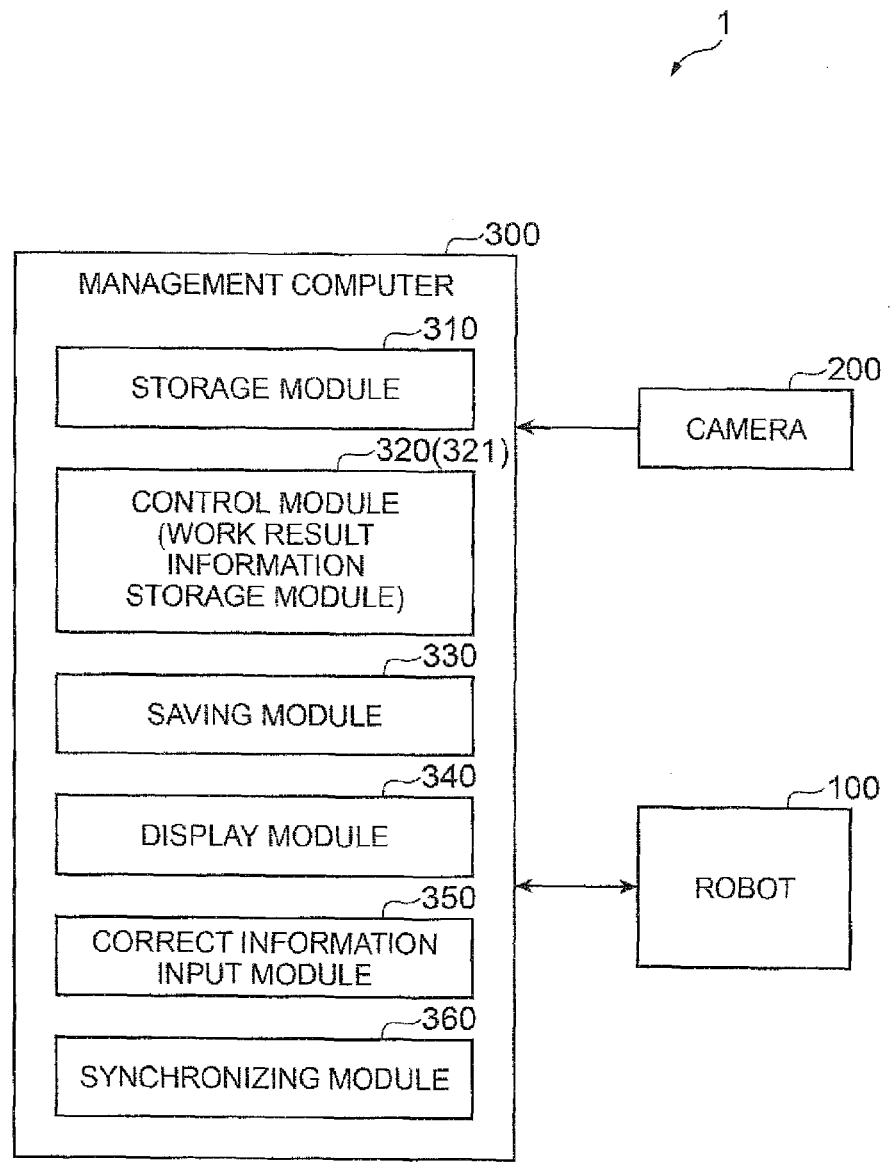
FIG. 1 is a schematic diagram illustrating a configuration of a robot system 1.

In the following, a plurality of embodiments of a robot system, a robot monitoring device, a robot monitoring method, a robot monitoring module, and a robot monitoring program according to the present disclosure will be described in detail with reference to the attached drawings. Note that same elements are denoted by same reference signs in the description for the drawings, and repetition of the same description will be omitted. Further, note that the drawings described below and the description related thereto are merely examples to describe the robot system, robot monitoring device, robot monitoring method, robot monitoring module, and robot monitoring program according to the present disclosure, and not intended to limit the scope of the present invention. Further, dimensions, etc. of respective units illustrated in the drawings may differ from the dimensions, etc. of the actually provided robot system, robot monitoring device, robot monitoring method, robot monitoring module, and robot monitoring program.

(General Configuration of Robot System 1)

First, a configuration of a robot system 1 will be described with reference to FIG. 1. FIG. 1 is a schematic diagram illustrating the configuration of the robot system 1. As illustrated in FIG. 1, the robot system 1 includes a robot 100, a camera 200 (imaging device), and a management computer 300 (robot monitoring device). Each of the robot 100, camera 200, and management computer 300 is connected via a communication network for mutual data communication. The robot system 1 thus configured is adopted in order to make an operator early and easily identify a step where an unfavorable situation has occurred in course of operation by the robot. In the following, respective component of the robot system 1 will be described in detail.

(Configuration of Robot 100)

Figure 2:
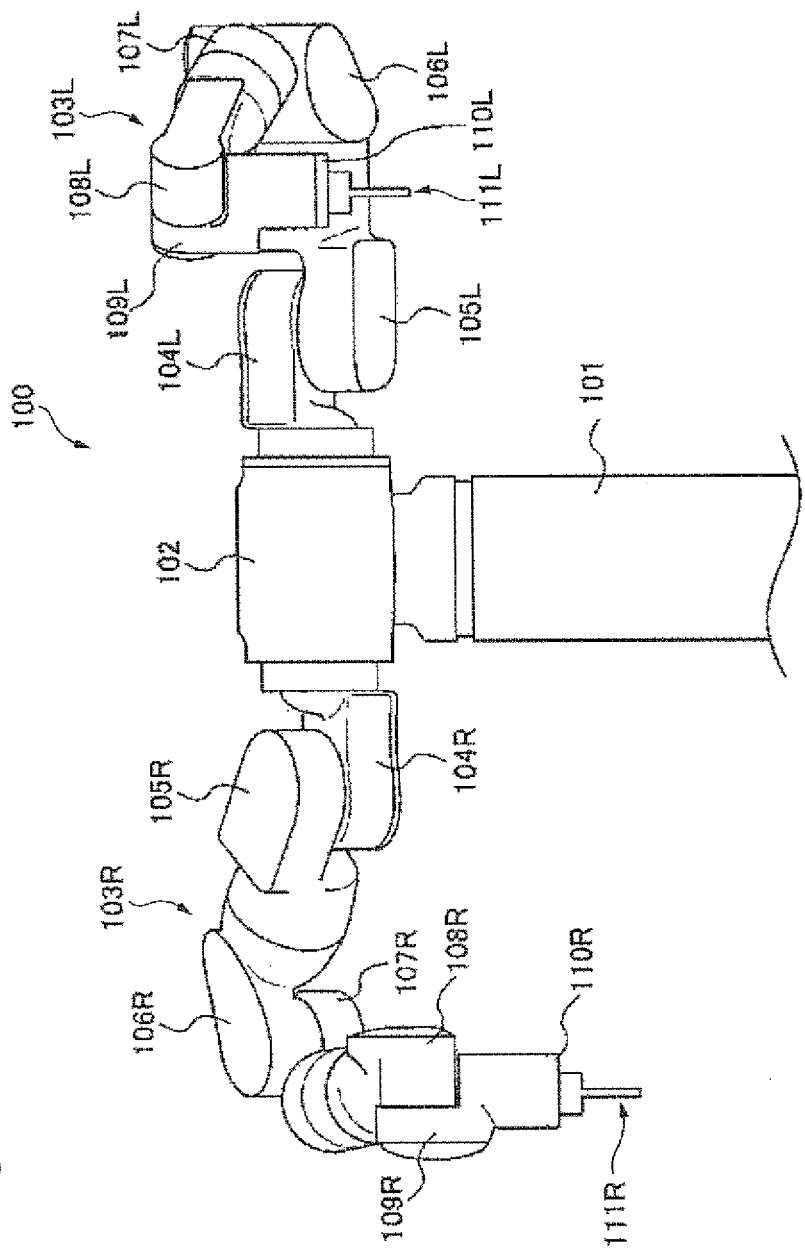
FIG. 2 is a front view of a robot 100 viewed from a front side.

First, a configuration of the robot 100 will be described using FIG. 2. FIG. 2 is a front view of a robot 100 viewed from the front side. In an example illustrated in FIG. 2, the robot 100 is a work robot having two arms, but not limited thereto, the robot 100 may be an assembling robot such as a robot having a single arm, or a robot to perform work such as processing other than assembling.

In FIG. 2, the robot 100 is, for example, a vertical articulated robot including a base 101, a body portion 102, and two arms 103L, 103R. The base 101 is fixed to an installation surface (floor of a clean room, etc.) with an anchor bolt (not illustrated) or the like. The body portion 102 includes a first joint provided with an actuator (not illustrated) configured to execute rotational drive around a predetermined shaft. The body portion 102 is mounted on the base 101 in a pivotable manner via the first joint, and pivots in a direction substantially horizontal to the installation surface by being driven by the actuator provided at the first joint. Further, the body portion 102 supports the arms 103L, 103R formed separately; one arm on a side (right side in FIG. 2) and the other arm on the other side (left side in FIG. 2).

The arm 103L is a manipulator disposed on one side of the body portion 102, and includes a shoulder portion 104L, an upper arm A portion 105L, an upper arm B portion 106L, a lower arm portion 107L, a wrist A portion 108L, a wrist B portion 109L, a flange 110L, and a hand 111L, and further includes second to eight joints respectively provided with actuators (not illustrated) configured to rotatably drive the respective portions.

The shoulder portion 104L is connected to the body portion 102 in a rotatable manner via the second joint, and rotates around a predetermined rotary shaft substantially horizontal to the installation surface by being driven by the actuator provided at the second joint. The upper arm A portion 105L is connected to the shoulder portion 104L in a pivotable manner via the third joint, and pivots around a predetermined rotary shaft by being driven by the actuator provided at the third joint. The upper arm B portion 106L is connected a tip of the upper arm A portion 105L in a rotatable manner via the fourth joint, and rotates around a predetermined rotary shaft by being driven by the actuator provided at the fourth joint. The lower arm portion 107L is connected to the upper arm B portion 106L in a pivotable manner via the fifth joint, and pivots around a predetermined rotary shaft by being driven by the actuator provided at the fifth joint. The wrist A portion 108L is connected to a tip of the lower arm portion 107L in a rotatable manner via a sixth joint, and rotates around a predetermined rotary shaft by being driven by the actuator provided at the sixth joint. The wrist B portion 109L is connected to the wrist A portion 108L in a pivotable manner via a seventh joint, and pivots around a predetermined rotary shaft by being driven by the actuator provided at the seventh joint. The flange 110L is connected to a tip of the wrist B portion 109L in a rotatable manner via an eighth joint, and rotates around a predetermined rotary shaft by being driven by the actuator provided at the eighth joint. The hand 111L is mounted on a tip of the flange 110L, and rotates by following rotation of the flange 110L.

The arm 103R is a manipulator disposed on the other side of the body portion 102 and has the same configuration as the above-described arm 103L. The arm 103R includes a shoulder portion 104R, an upper arm A portion 105R, an upper arm B portion 106R, a lower arm portion 107R, a wrist A portion 108R, a wrist B portion 109R, a flange 110R, and a hand 111R, and further includes ninth to fifteenth joints respectively provided with actuators (not illustrated) configured to rotatably drive the respective portions.

The shoulder portion 104R, upper arm A portion 105R, upper arm B portion 106R, lower arm portion 107R, wrist A portion 108R, wrist B portion 109R, flange 110R, and hand 111R have the symmetric same configurations as the above-described shoulder portion 104L, upper arm A portion 105L, upper arm B portion 106L, lower arm portion 107L, wrist A portion 108L, wrist B portion 109L, flange 110L, and hand 111L. Therefore, a description therefor will be omitted here.

As illustrated in FIG. 2, the body portion 102 may have one joint, namely, a single degree of freedom, and each of the arms 103L, 103R may have the seven joints, namely, seven degrees of freedom (redundant degree of freedom). In this case, the robot 100 has fifteen degrees of freedom in total. Note that the number of joints of the arms 103L, 103R, namely, the number of freedom is not limited to "7" exemplified in the present embodiment, and may be "2" or more in accordance with work contents.

With the above configuration, the robot 100 can perform a complex and delicate process that has relied on manual work till today on behalf of an operator, and reproductivity higher than a human can be achieved in a field such as biomedical field.

(Operation of Robot 100)

Figure 3:
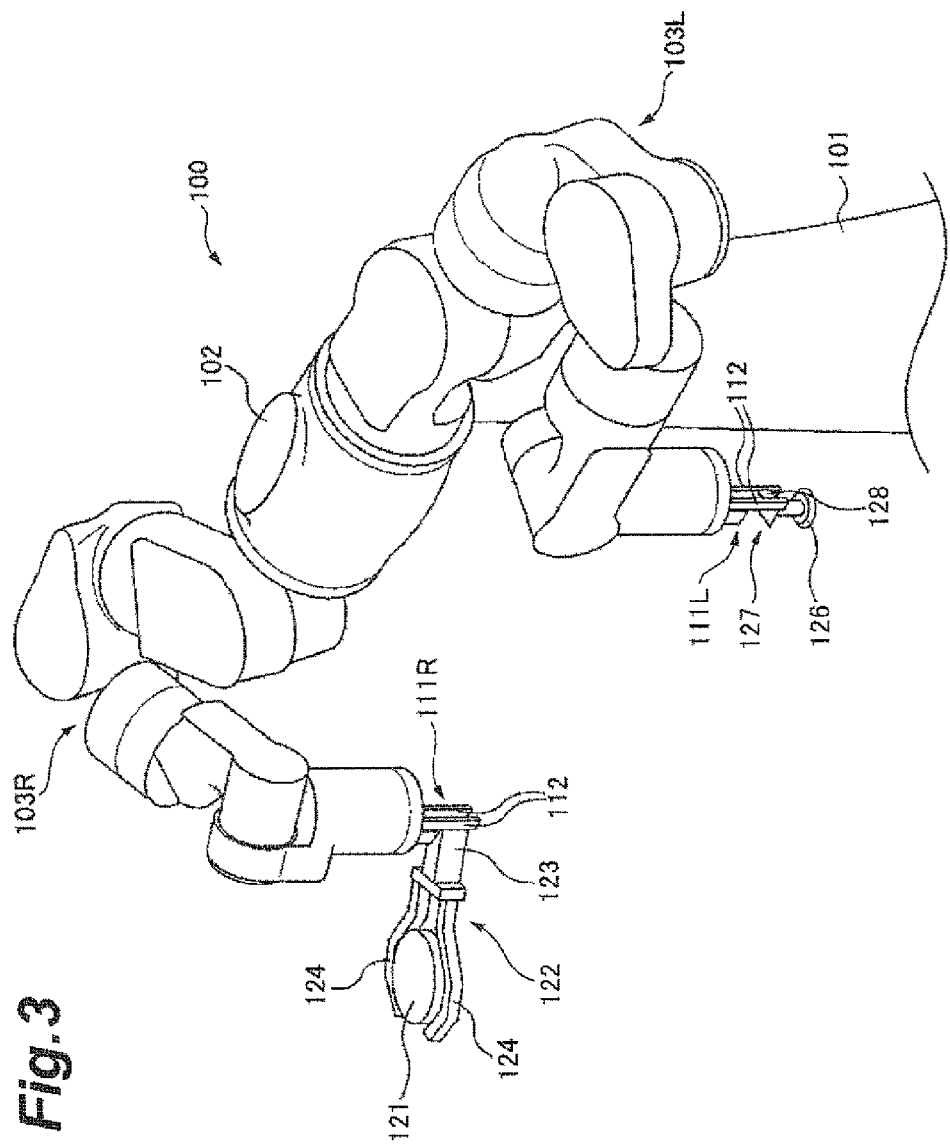
FIG. 3 is a perspective view illustrating a state in which the robot 100 moves a petri dish 121 by using a holder 122.
Figure 4:
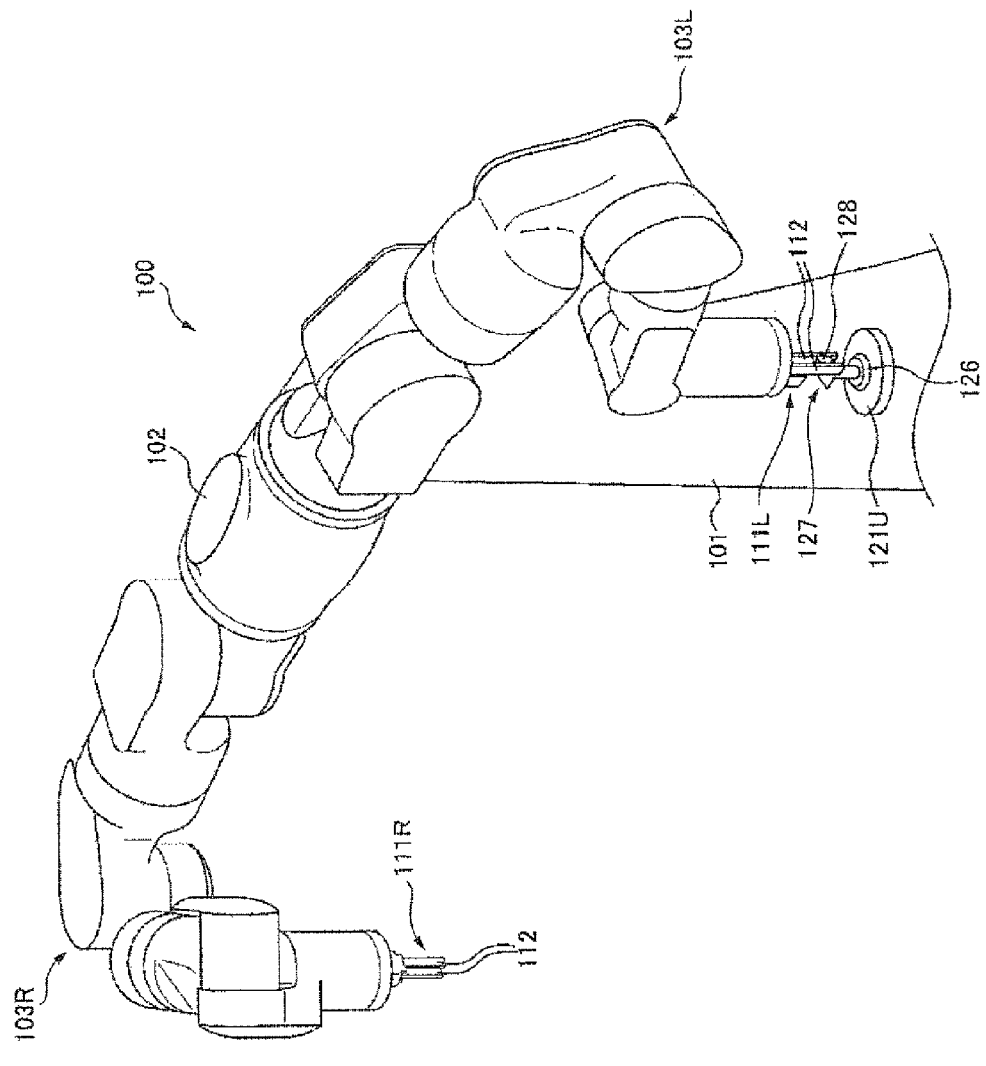
FIG. 4 is a perspective view illustrating a state after the robot 100 has opened a cover 121U of the petri dish 121 by using a suction pad 126.
Figure 5:
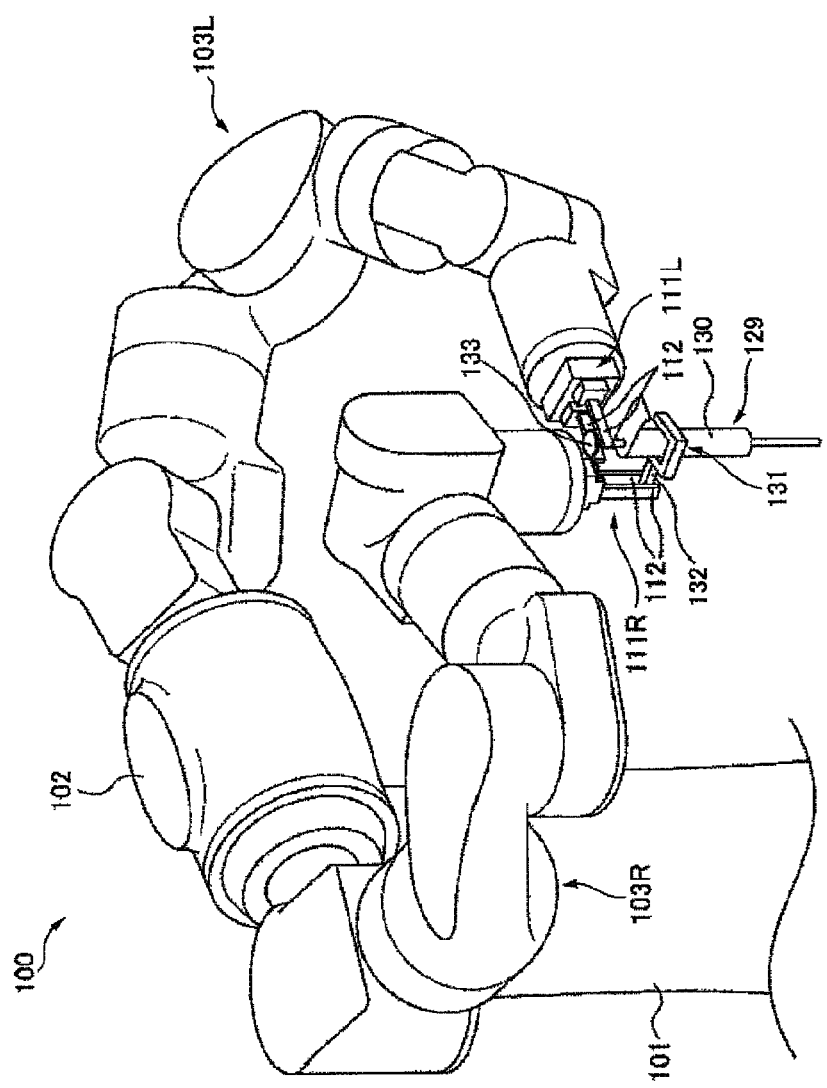
FIG. 5 is a perspective view illustrating a state in which the robot 100 performs treatment by using a pipette 129.
Figure 6:
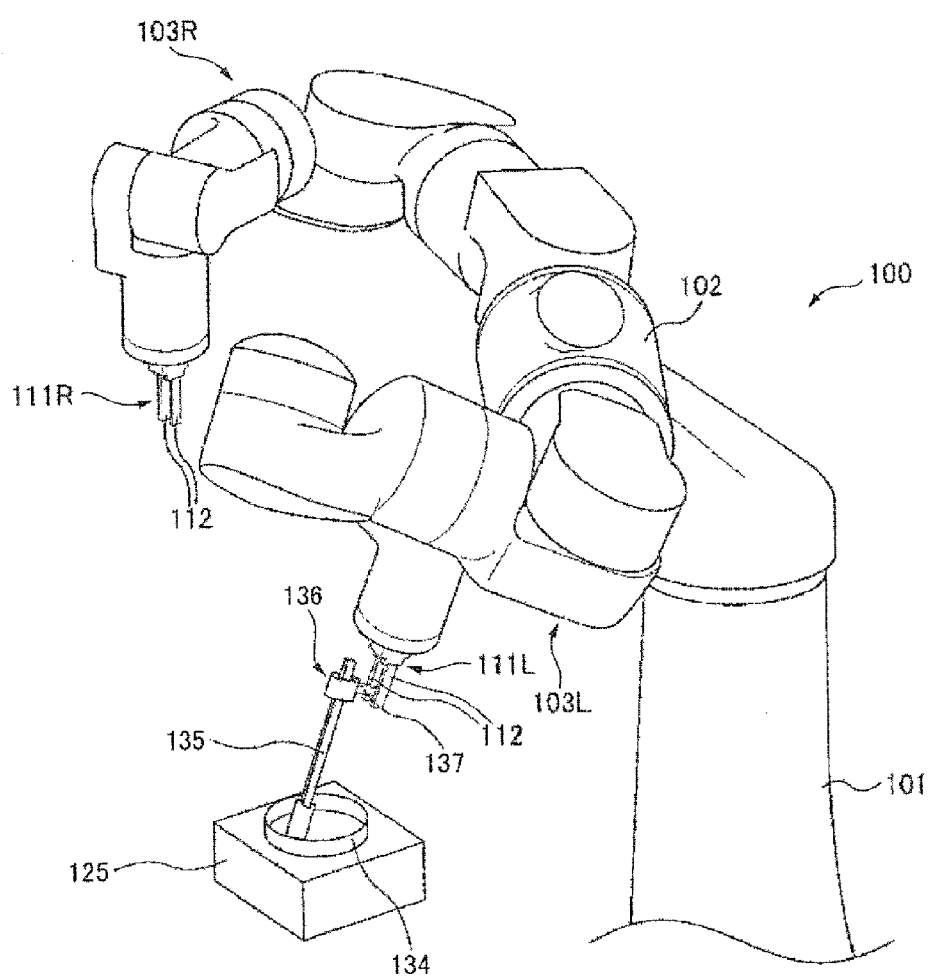
FIG. 6 is a perspective view illustrating a state in which the robot 100 performs treatment of stirring a specimen by using a paddle 135.

Next, an exemplary operation of the robot 100 will be described with reference to FIGS. 3, 4, 5 and 6. The robot 100 performs the complex and delicate process that has relied on the manual work till today, for example, first moving a petri dish 121, subsequently opening the cover 121U of the petri dish 121, then performing treatment by using the pipette 129, and further performing treatment such as stirring a specimen by using the paddle 135. FIG. 3 is a perspective view illustrating a state in which the robot 100 moves the petri dish 121 by using a holder 122. FIG. 4 is a perspective view illustrating a state after the robot 100 has opened a cover 121U of the petri dish 121 by using a suction pad 126. FIG. 5 is a perspective view illustrating a state in which the robot 100 performs treatment by using the pipette 129. FIG. 6 is a perspective view illustrating a state in which the robot 100 performs treatment of stirring a specimen by using the paddle 135.

In FIGS. 3 to 6, the robot 100 does not start operation and waits until a start command is input from a control module 320 (or control module 410) described later. Further, operation is started when the start command is input from the control module 320. Note that, in the following description for the operation, which one of the arms 103R, 103L is to be used is merely recited as an example, and therefore, the arm on the opposite side may be used as well and also both arms may be cooperatively used to perform the work to be carried out by one arm.

As illustrated in FIG. 3, the robot 100 swings the arm 103R and grips a gripping portion 123 of a holder 122 by using two gripping members 112 provided at the hand 111R. After that, the two gripping members 124 for the petri dish provided at the holder 122 are manipulated by the hand 111R, thereby gripping the petri dish 121 housed inside an incubator (not illustrated), removing the petri dish 121 from the incubator, and then placing the removed petri dish 121 on a petri dish stage 125 (refer to FIG. 6).

Subsequently, as illustrated in FIG. 4, the robot 100 swings the arm 103L and grips a gripping portion 128 of a holder 127 mounted on the suction pad 126 by using the two gripping members 112 provided at the hand 111L. Then, the cover 121U of the petri dish 121 placed on the petri dish stage 125 is suctioned and lifted by manipulating the suction pad 126 by the hand 111L via the holder 127.

After that, as illustrated in FIG. 5, the robot 100 swings the arm 103R and grips a gripping portion 132 of a holder 131 mounted on a main body 130 of the pipette 129 by using the two gripping members 112 provided at the hand 111R. Subsequently, a chip (not illustrated) which is a cartridge for a micro pipette is attached to a tip of the pipette 129 gripped by the hand 111R. After that, the robot 100 swings the arm 103L to manipulate a push button 133 with the hand 111L, thereby suctioning reagent via the chip and injecting the suctioned reagent to a bottom saucer 134 (refer to FIG. 6) of the petri dish 121 placed on the petri dish stage 125. After injection, the robot 100 swings the arm 103R to move the hand 111R below a table (not illustrated), removes the used chip from the tip of the pipette 129 by a predetermined manipulation, and disposes of the chip in a disposal box (not illustrated).

After that, as illustrated in FIG. 6, the robot 100 swings the arm 103L and grips a gripping portion 137 of a holder 136 mounted on the paddle 135 by using the two gripping members 112 provided at the hand 111L. Then, the specimen inside the bottom saucer 134 of the petri dish 121 placed on the petri dish stage 125 is stirred by manipulating the paddle 135 with the hand 111L via the holder 136. After stirring, the robot 100 swings the arm 103L to move the hand 111L below the table (not illustrated) and disposes of the used paddle 135 in the disposal box (not illustrated).

After that, the robot 100 continues operation. A detailed description and illustration will be omitted, but for example, following operation is performed by the robot: a cover of a test tube (not illustrated) is opened and then supernatant solution (specimen) inside the bottom saucer 134 of the petri dish 121 is suctioned with the pipette 129 and injected into the test tube; the cover of the test tube is closed and then the test tube is set at a heater/cooler (not illustrated) to be heated or cooled; the test tube is set at a centrifugal separator (not illustrated) after the treatment of heating or cooling, and the specimen is centrifuged and separated for a predetermined period, and so on.

(Configuration of Management Computer 300)

Figure 7:
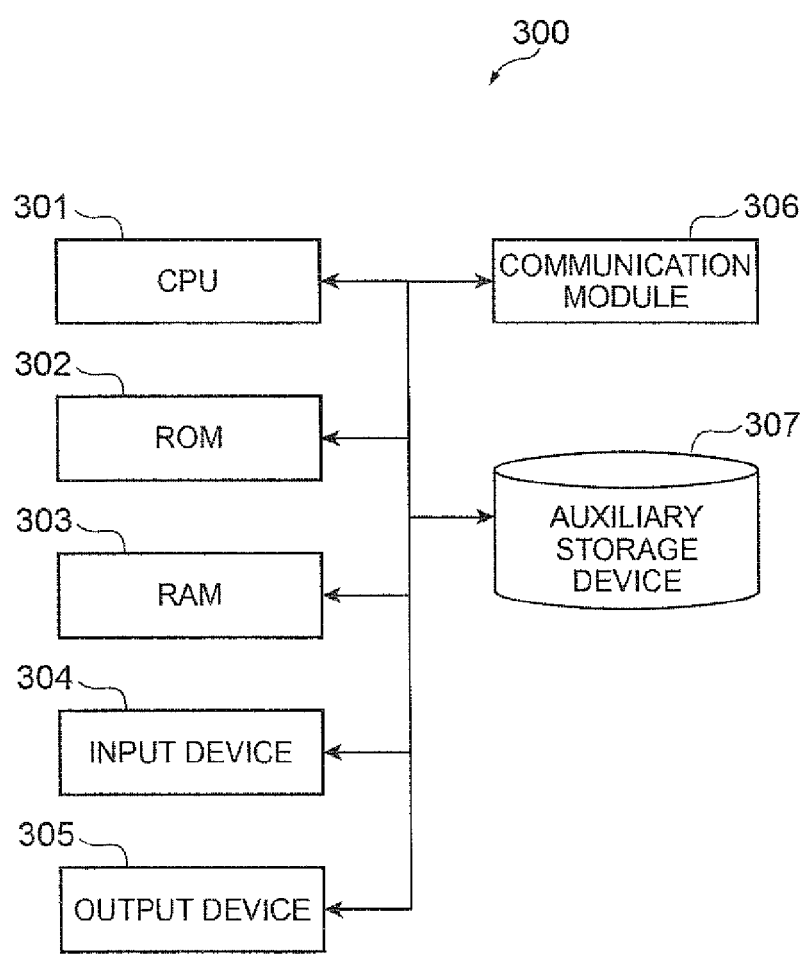
FIG. 7 is a diagram illustrating a hardware configuration of a management computer 300.

Subsequently, a configuration of the management computer 300 will be described. FIG. 7 is a diagram illustrating a hardware configuration of the management computer 300. As illustrated in FIG. 7, the management computer 300 is physically configured as a general computer system including a circuit having: a CPU 301; main memory devices such as a ROM 302 and a RAM 303; input devices 304 such as a keyboard and a mouse; and an output device 305 such as a display; a communication module 306 such as a network card configured to transmit and receive data between the robot 100, camera 200, etc.; and an auxiliary storage device 307 such as a hard disk. Respective functions of the management computer 300 described later are implemented by operating the input device 304, output device 305, and communication module 306 under control of the CPU 301 by causing the hardware such as the CPU 301, ROM 302, RAM 303, etc. to read predetermined computer software, and also by executing data reading and writing in the main memory devices 302, 303 and the auxiliary storage device 307.

The functional components of the management computer 300 will be described with reference to FIG. 1. As illustrated in FIG. 1, the management computer 300 functionally includes a storage module 310 (storage device), a control module 320 (control device), a saving module 330 (saving device), a display module 340 (display device), a correct information input module 350 (corrected information input device), and a synchronizing module 360 (synchronizing device). These functional components may be individually separated on the hardware, or any of two or more components may be configured as a set of hardware without being separated. Processing by each component corresponds to processing by the management computer 300 because each part is a functional component of the management computer 300.

The storage module 310 stores work contents information to indicate a series of work contents of the robot 100. The storage module 310 may be configured by, for example, the auxiliary storage device 307. FIG. 8 is a diagram illustrating an image of the exemplary work contents information stored by the storage module 310. As an example, there are two kinds of work contents including a main category and a sub category, and an ID is assigned to each of the work contents. The work contents of the sub category are included in the work contents of the main category. Note that the work contents in FIG. 8 conform to the work contents in the operation of the robot 100 exemplified by using above FIGS. 3 to 6. More specifically, the work contents of W1 including W11 to 14 in FIG. 8 correspond to the operation of the robot 100 in FIG. 3, the work contents of W2 including W21 and W22 in FIG. 8 correspond to the operation of the robot 100 in FIG. 4, the work contents of W3 including W31 to W37 in FIG. 8 correspond to the operation of the robot 100 in FIG. 5, and the work contents of W4 including W41 to W44 in FIG. 8 correspond to the operation of the robot 100 in FIG. 6. Note that recitation of work contents of sub categories in W5 to W10 will be omitted in FIG. 8.

Referring back to FIG. 1, the control module 320 controls the robot 100 in accordance with the work contents information stored in the storage module 310, and causes the robot 100 to perform predetermined work. The control module 320 controls the robot 100 in accordance with, for example, the work contents information illustrated in FIG. 8. The control module 320 controls the robot 100 so as to perform the work sequentially from W1 to W10, for example. The control module 320 may be configured by, for example, the CPU 301 and the auxiliary storage device 307.

The control module 320 may include a work result information storage module 321 configured to store work result information indicating a work result of the robot 100. The work result information storage module 321 includes work time information indicating time when the robot 100 has accomplished the work, and the work result information indicating whether the robot 100 has successfully accomplished the work. FIG. 9 is a diagram illustrating an image of the exemplary work result information stored by the work result information storage module 321. FIG. 9 illustrates, for example, a fact that the work of the sub category W11 is performed in a period from 0:00:00 to 0:00:05, and the work of the main category W1 including the sub categories W11 to W14 is performed in a period from 0:00:00 to 0:00:20. Further, in FIG. 9, the work of the main categories W1 to W3 is successfully accomplished, and therefore, a result of work is indicated by "OK". On the other hand, W42 is indicated by "NG" and W4 including W42 is also indicated by "NG" because the work of the sub category W42 resulted in failure. Meanwhile, a separate module (not illustrated) capable of determining a work result may be provided as well. In such a case, the separate module may create information indicating a work result and transmit the information to the work result information storage module 321. The above-described work result information storage module 321 may be configured by, for example, the auxiliary storage device 307.

The saving module 330 saves image information obtained from image capturing by the camera 200 in association with the time information. The saving module 330 may be configured by, for example, the auxiliary storage device 307.

Here, the camera 200 may be set at a place where the robot 100 can be imaged appropriately and configured to capture an image of operation of the robot 100. The camera 200 may be formed of, for example, a CCD camera or the like. For example, a captured image from the camera 200 set above the robot 100 or on the right and left sides of the robot 100 is output to the saving module 330 via, for example, the communication network. The image captured by the camera 200 may be a moving image or a still image. The number of cameras 200 may be one or plural as long as being capable of appropriately capturing an image of the robot 100. The saving module 330 may save the image information input from the camera 200 in association with the work contents information.

FIG. 10 is a diagram illustrating an image of exemplary information stored by the saving module 330. Moving image data having an image ID V1 is captured during a period from 0:00:00 to 0:04:00 and corresponds to image capturing for the robot 100 performing the work of the main categories IDs W1 to W10. According to FIG. 10, timing when each of the work is performed can be easily grasped.

The display module 340 displays the image information saved in the saving module 330 together with the time information. Further, the display module 340 may display the image information and the time information together with the work contents information by referring to the storage module 310. Moreover, the display module 340 may also display the image information and the time information together with the work result information by referring to the work result information storage module 321. The display module 340 may be configured by, for example, the output device 305.

Figure 11:
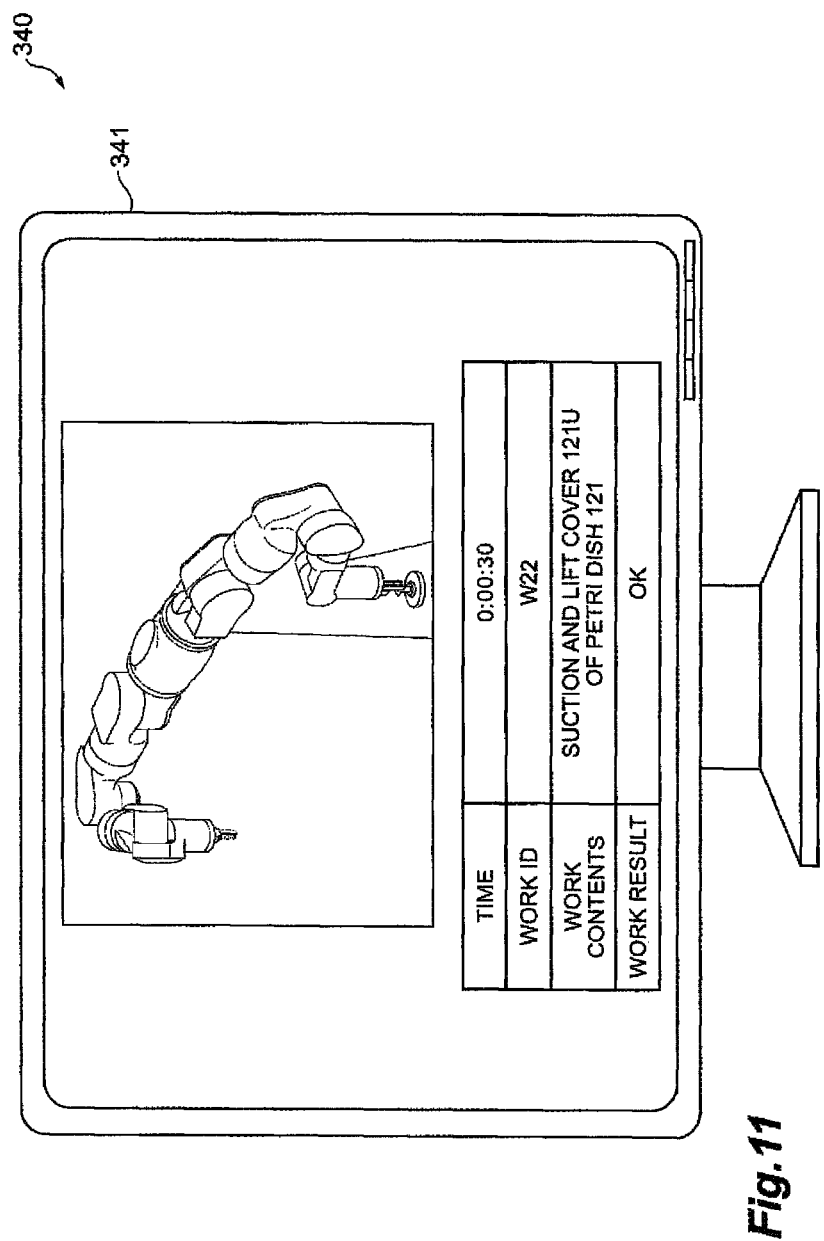
FIG. 11 is a diagram illustrating an image of an exemplary display screen 341 of a display module 340.
Figure 12:
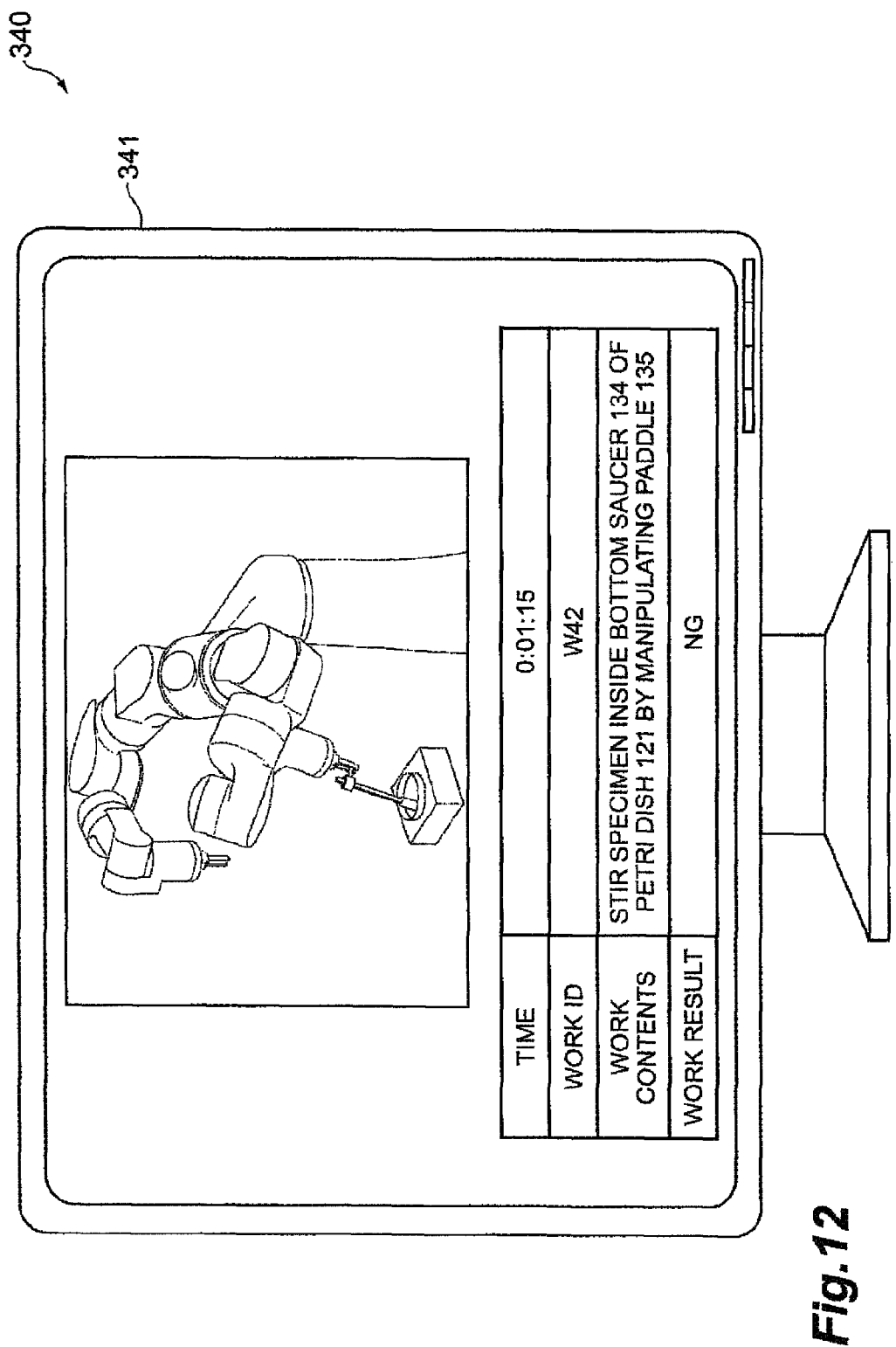
FIG. 12 is a diagram illustrating another image of the exemplary display screen 341 of the display module 340.

FIGS. 11 and 12 are diagrams illustrating examples of a display screen 341 of the display module 340. The images captured during a period from 0:00:00 to 0:04:00 are sequentially displayed as a moving image with time passage, and a moment illustrated in FIG. 11 is the time 0:00:30 when 30 seconds have passed from start of the work. In FIG. 11, the robot 100 performs the work of the work ID W22, and the work result is indicated by "OK", that is, the work is successful. On the other hand, a moment illustrated in FIG. 12 is the time 0:01:15 when one minute and fifteen seconds have passed from start of the work. In FIG. 12, the robot 100 performs the work of the work ID W42, and the work result is indicated by "NG", that is, the work is failed.

In the case where the work result information displayed on the display module 340 indicates that the robot 100 has not successfully accomplished the work, the correct information input module 350 is used in order that an operator corrects the work contents information corresponding to the failed work. The correct information input module 350 may be configured by, for example, the input device 304 and the output device 305.

FIGS. 13A and 13B are diagrams illustrating images of exemplary operation in the correct information input module 350. In the example of FIG. 12, the work result information displayed on the display module 340 indicates that the robot 100 has not successfully accomplished the work of the work ID W42. Therefore, the correct information input module 350 displays, for the operator, present work contents as illustrated in FIG. 13A, namely, the work contents before correction. Then, the operator inputs future work contents as illustrated in FIG. 13B, namely, the work contents after correction via the correct information input module 350. In this example, the work of the work ID W42 is determined as failure because a length of paddle 135 is too short, for example. Therefore, the operator suitably corrects four kinds of the work of the work ID W4 so as to use a different long paddle instead of the paddle 135.

The synchronizing module 360 synchronizes time information in the camera 200 with time information in the saving module 330. The time information may be the information indicating general standard time, or the information indicating relative timing between the camera 200 and the saving module 330. Note that the time illustrated in FIGS. 9 to 12, for example, 0:01:15 is not the general standard time (that is absolute time). The time of 0:01:15 indicates relative time in the case where starting timing of work is set at 0:00:00, more specifically, this is the time indicating that one minute and fifteen seconds have passed from start of the work. The synchronizing module 360 thus configured may be configured by, for example, the CPU 301.

(Operation of Robot System 1)

Figure 14:
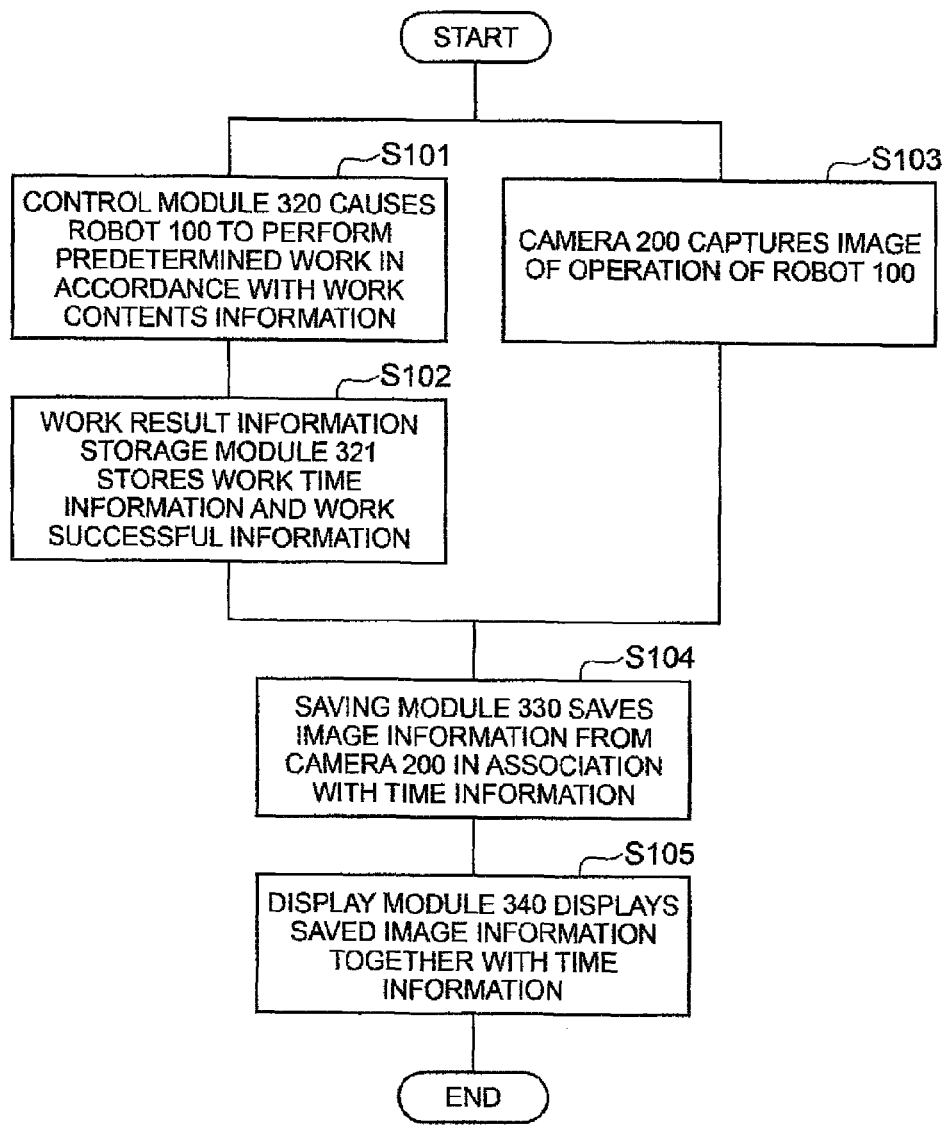
FIG. 14 is a flowchart illustrating operation of the robot system 1.

Next, operation performed by the robot system 1 will be described with reference to FIG. 14. FIG. 14 is a flowchart illustrating operation of the robot system 1.

First, the control module 320 sequentially controls the robot 100 in accordance with the work contents information stored in the storage module 310 and causes the robot 100 to sequentially perform predetermined work (Step S101, control step). Here, the storage module 310 preliminarily stores, for example, the work contents information indicating a series of the work contents of the robot 100 as described above referring to FIG. 8.

Next, the work result information storage module 321 sequentially stores, for example, the work time information indicating the time (or time band) when the robot 100 accomplished the work, and the work result information indicating whether the robot 100 has successfully accomplished the work as described with reference to FIG. 9 (Step S102).

The camera 200 captures an image of the robot 100 simultaneously with Steps S101 and S102. The camera 200 outputs the captured image obtained by image capturing to the saving module 330 (Step S103).

Next, the saving module 330 saves the image information from the camera 200 in association with the time information as described above with reference to FIG. 10. At this point, the saving module 330 may save the image information in association with the information indicating the work ID as illustrated in FIG. 10 (Step S104, saving step).

Subsequently, the display module 340 displays, for example, the image information saved in Step S104 together with the time information as described above with reference to FIGS. 11 to 12. At this point, the display module 340 may display the image information and the time information together with the work contents information and the work result information as illustrated in FIGS. 11 and 12 (Step S105, display step).

(Different Configuration of Robot System 1)

The configuration in which the robot system 1 includes the robot 100, camera 200, and management computer 300 has been described above as illustrated in FIG. 1. More specifically, the robot system 1 illustrated in FIG. 1 includes the robot 100, camera 200, and management computer 300 including the input device 304 and the output device 305. Within the system, the storage module 310, control module 320, saving module 330, and synchronizing module 360 are configured by the management computer 300, and further the display module 340 is configured by the output device 305 included in the management computer 300, and furthermore, the correct information input module 350 is configured by the input device 304 and the output device 305 included in the management computer 300.

Figure 15:
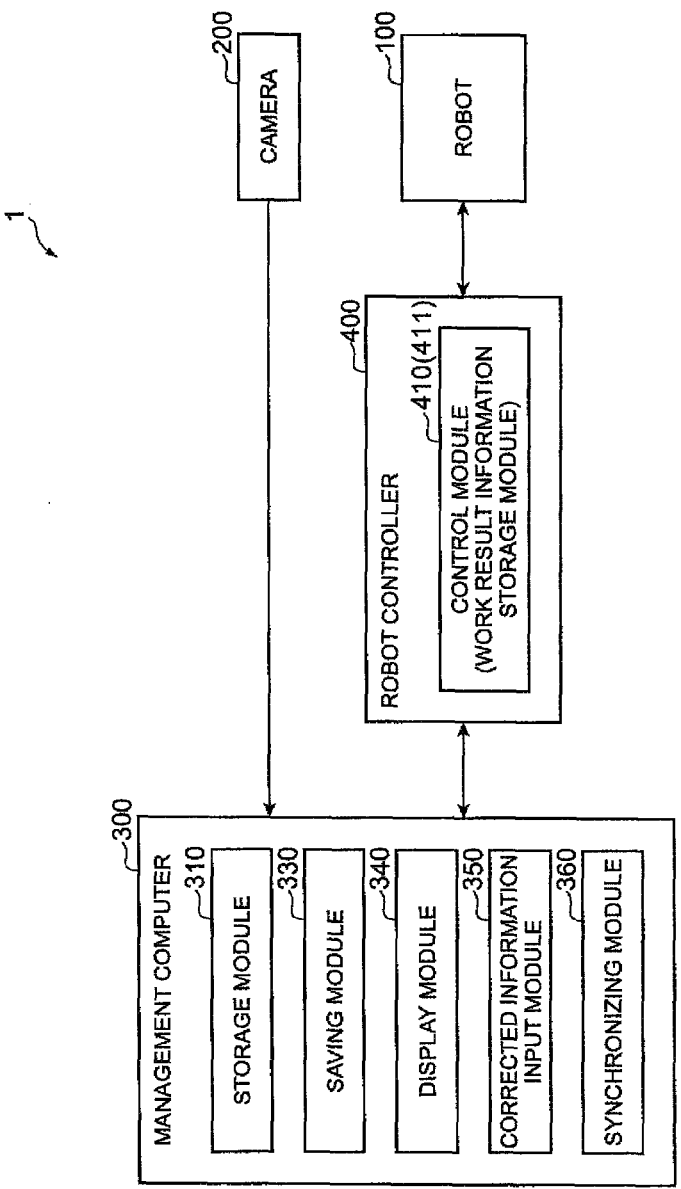
FIG. 15 is a diagram illustrating a different schematic configuration of the robot system 1.

However, the present disclosure is not limited thereto and includes various kinds of configuration modes. FIG. 15 is a diagram illustrating a different schematic configuration of the robot system 1. According to the configuration illustrated in FIG. 15, the robot system 1 further includes a robot controller 400 in addition to the robot 100, camera 200, and management computer 300, compared to the configuration illustrated in FIG. 1.

The robot controller 400 includes a hardware configuration similar to the configuration illustrated in FIG. 7, and controls operation of the robot 100. The robot controller 400 is connected to the robot 100 and the management computer 300 via the communication network for mutual data communication. One of the functional components included in the robot controller 400 is a control module 410. The control module 410 has functions and operation same as the above-described control module 320 except for being placed at a different position. Therefore, a description therefor will be omitted here. A work result information storage module 411 included in the control module 410 is same as the above-described work result information storage module 321 except for being placed at a different position. Therefore, a description therefor will be omitted here.

More specifically, the robot system 1 illustrated in FIG. 15 includes the robot 100, camera 200, management computer 300 including the input device 304 and output device 305, and robot controller 400. Within the system, the storage module 310, saving module 330, and synchronizing module 360 are configured by the management computer 300 while the control module 410 is configured by the robot controller 400. Further, the display module 340 is configured by the output device 305 included in the management computer 300, and furthermore the correct information input module 350 is configured by the input device 304 and the output device 305 included in the management computer 300. Note that, in this example, the storage module 310 is placed on the management computer 300, but not limited thereto, the storage module 310 may be placed in the robot controller 400.

(Another Different Configuration of Robot System 1)

FIG. 16 is a diagram illustrating another different schematic configuration of the robot system 1. According to the configuration illustrated in FIG. 16, the robot system 1 further includes a programming pendant 500 (operation terminal for operator) in addition to the robot 100, camera 200, management computer 300, and robot controller 400, compared with the configuration illustrated in FIG. 15.

The programming pendant 500 is an operation terminal used at a site in order that an operator operates the robot 100. The programming pendant 500 includes a hardware configuration such as a display screen and an information input button, and is connected to the management computer 300 and the robot controller 400 via, for example, a wireless communication network for mutual data communication.

The programming pendant 500 includes a pendant-side display module 510 and a pendant-side correct information input module 520 as functional components. The pendant-side display module 510 is formed of, for example, a display screen of the programming pendant 500, and displays information same as the information displayed on the display module 340 of the management computer 300. Meanwhile, the pendant-side display module 510 may display information arranged in a small screen size. The pendant-side correct information input module 520 is formed of, for example, an information input button or the like of the programming pendant 500, and has functions same as the correct information input module 350 of the management computer 300.

More specifically, the robot system 1 illustrated in FIG. 16 includes the robot 100, camera 200, management computer 300 including the input device 304 and output device 305, robot controller 400, and programming pendant 500. Within the system, the storage module 310, saving module 330, and synchronizing module 360 are configured by the management computer 300 while the control module 410 is configured by the robot controller 400. Further, the display module 340 is configured by the output device 305 included in the management computer 300 while the pendant-side display module 510 having the same functions as the display module 340 is placed on the programming pendant 500. Further, the correct information input module 350 is configured by the input device 304 and output device 305 included in the management computer 300 while the pendant-side correct information input module 520 having the same function as the correct information input module 350 is placed on the programming pendant 500. Note that, in this example, the storage module 310 is placed on the management computer 300, but not limited thereto, the storage module 310 may be placed in the robot controller 400.

Other Embodiments

In the above description, an example of a robot system 1 including a robot 100, a camera 200, a management computer 300, a robot controller 400, a programming pendant 500, etc. is exemplified as the embodiment of the present disclosure. However, the present embodiment is not limited thereto and may be configured as a robot monitoring module including a module to execute respective functions in respective components. More specifically, the robot monitoring module may be configured based on the description related to the above-described robot system 1, in which work contents information to indicate a series of work contents of the robot 100 is stored in a storage module 310, and the robot monitoring module includes: a control module configured to cause the robot 100 to perform predetermined work in accordance with the work contents information; a saving module configured to save image information obtained by image capturing by the camera 200 configured to capture an image of operation of the robot 100 in association with time information; and a display module configured to display the image information saved in the saving module together with the time information.

Further, in the same manner, a robot monitoring program may be configured in order to cause a computer to execute respective functions in respective components. More specifically, the robot monitoring program may be configured, in which work contents information to indicate a series of work contents of the robot 100 is stored in the storage module 310, and the robot monitoring program causes the computer to execute: a control function to make the robot 100 perform predetermined work in accordance with the work contents information; a saving function to save image information obtained by image capturing by the camera 200 configured to capture an image of operation of the robot 100 in association with the time information; and a display function to display the image information saved by the saving function together with the time information. Further, the functions equivalent to those of the above-described robot system 1 can be implemented by causing the computer to read the program. The program thus configured can be recorded in a recoding medium. The recording medium referred herein is capable of causing changes in a state of energy such as magnetism, light or electricity in accordance with description contents of the program relative to a reading device included in a hardware resource of the computer, and transferring the description contents of the program to the reading device in a signal form corresponding thereto. Examples of such a recording device are a magnetic disk, an optical disk, a CD-ROM, a memory included inside the computer, and so on.

Functions and Effects of Present Embodiments

In the case where the difficulty level of work to be performed by the robot is high, a protocol is minutely created in accordance with contents of the work, and the robot is made to learn the work contents in advance. At the time of learning, presumably there are some trials and errors, and there is a need of early and easily detecting a step where an unfavorable situation has occurred in course of operation by the robot. Further, in the case of performing actual work after the learning, the robot may also fail in the work such as dropping a workpiece. In the related arts, there may be a case where a monitoring camera is set and visual information and history information relative to operation of the robot are saved as electronic data in order to find out a cause of the failure. However, in some cases, it may be difficult to early and easily detect a step where an unfavorable situation has occurred.

According to the robot system 1 and the like according to the present embodiments, a captured image of the robot 100 is saved in association with the time information, and when the display module 340 displays the captured image, the time information is displayed together. Since the captured image is displayed together with the time information, an operator can easily grasp at which timing the robot 100 has performed which operation. Therefore, the robot system 1 can support the operator such that the operator can early and easily identify a step where an unfavorable situation has occurred in course of operation of the robot 100.

Further, according to the present embodiments, a captured image of the robot 100 is saved in association not only with the time information but also with the work contents information, and when the display module 340 displays the captured image, the time information and the work contents information are displayed together. Since the captured image is displayed together with the time information and the work contents information, the operator can more easily grasp at which timing the robot 100 has performed which operation. Therefore, the robot system 1 can further support the operator such that the operator can early and easily identify the step where the unfavorable situation has occurred in course of operation of the robot 100.

Furthermore, according to the present embodiments, when the display module 340 displays the captured image, not only the time information and work contents information but also the work result information are displayed together. Since the captured image is displayed together with the time information, work contents information, and work result information, the operator can grasp at which timing the robot 100 has performed which operation and further whether the operation resulted in success or failure. Therefore, the robot system 1 can support more the operator such that the operator can early and easily identify the step where the unfavorable situation has occurred in course of operation of the robot 100.

Moreover, according to the present embodiments, the operator can correct the work contents by using the correct information input module 350, and therefore, the work contents at the step where the unfavorable situation has occurred in course of operation of the robot 100 can be early and easily corrected, and operation of the robot can be repeatedly tested such that the robot 100 can correctly operate. The correct information input module 350 may be placed in the management computer 300 or may be placed in the programming pendant 500 depending on work environment. By this, the device can be flexibly configured suitable for the work environment.

Additionally, according to the present embodiments, the synchronizing module 360 synchronizes the time information in the camera 200 with the time information in the saving module 330, and the display module 340 performs display based on the synchronized time. With this configuration, the robot system 1 can surely support the operator such that the operator can early and easily identify the step where the unfavorable situation has occurred in course of operation of the robot 100 without confusing the operator by non-synchronized time between the camera 200 and the management computer 300. Also, since the time information in the camera 200 is synchronized with the time information in the saving module 330, improvement of traceability can be expected. Further, improvement of robustness of data can be also expected. Additionally, as long as synchronization is kept between the camera 200 and the management computer 300, synchronization may be kept based on an absolute time or kept based on a relative time.

Further, according to the present embodiments, the robot system 1 may have the configuration including the robot 100, camera 200, and management computer 300, and further including the robot controller 400. Additionally, the programming pendant 500 may be further included. Thus, the robot system 1 may have various kinds of configuration modes, and can be flexibly configured to be suitable for the situations. Further, there may be the configuration as the robot monitoring module to perform the same functions as the robot system 1, and also the configuration as the robot monitoring program to cause the computer to perform the same functions.

While the embodiments of the present invention have been described above, needless to mention, the present invention is not limited thereto.

For example, according to the above-described embodiments, the programming pendant 500 is exemplified as a portable operation terminal which the operator can use at the site in order to manipulate the robot 100, but not limited thereto, other operation terminal may be suitably applied instead of the programming pendant 500 as long as the operation terminal can be used by the operator at the site to manipulate the robot 100.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A robot system, comprising:
a robot;
an imaging device configured to capture an image of operation of the robot; and
a circuit configured to:
control the robot so as to perform work in accordance with work contents information preliminarily stored to indicate a series of work contents;
save image information captured by the imaging device during work performance by the robot in association with time information; and
display the saved image information together with the time information, wherein
the circuit is configured to save the image information in association with the work contents information, and sequentially display the image information simultaneously with the work contents information as a moving image.

2. The robot system according to claim 1, wherein
the circuit is configured to store work result information to indicate whether the robot has successfully accomplished the work, and display the image information together with the work result information.

3. The robot system according to claim 2, further comprising
a corrected information input device in order that an operator corrects the work contents information corresponding to the work in the case where the work result information displayed by the circuit indicates that the robot has not accomplished the work successfully.

4. The robot system according to claim 2, further comprising
a corrected information input circuit configured to allow an operator to correct the work contents information corresponding to the work in the case where the work result information displayed by the circuit indicates that the robot has not accomplished the work successfully.

5. The robot system according to claim 1, wherein
the circuit is configured to synchronize time information in the imaging device with time information in the circuit.

6. The robot system according to claim 1, wherein
the time information indicates relative timing between the imaging device and the circuit.

7. The robot system according to claim 1, wherein
the circuit includes
a control module configured to control the robot so as to perform work in accordance with work contents information preliminarily stored to indicate a series of work contents,
a saving module configured to save image information captured by the imaging device during work performance by the robot in association with time information, and
a display module configured to display the image information saved by the saving module together with the time information, wherein
the saving module saves the image information in association with the work contents information, and
the display module displays the image information together with the work contents information.

8. The robot system according to claim 7, wherein
the control module is configured to store work result information indicating whether the robot has successfully accomplished the work, and
the display module displays the image information together with the work result information.

9. The robot system according to claim 8, further comprising
a corrected information input device in order that an operator corrects the work contents information corresponding to work in the case where the work result information displayed by the display module indicates that the robot has not accomplished the work successfully.

10. The robot system according to claim 9, wherein
the circuit includes a computer including a display and an input device, and a robot controller,
the saving module is configured by the computer,
the control module is configured by the robot controller,
the display module is configured by the display, and
the corrected information input device is configured by the input device.

11. The robot system according to claim 8, further comprising
a corrected information input circuit configured to allow an operator to correct the work contents information corresponding to work in the case where the work result information displayed by the display module indicates that the robot has not accomplished the work successfully.

12. The robot system according to claim 7, wherein
the circuit further includes
a synchronizing module configured to synchronize time information in the imaging device with time information in the saving module.

13. The robot system according to claim 7, wherein
the circuit includes a computer including a display and a robot controller,
the saving module is configured by the computer,
the control module is configured by the robot controller, and
the display module is configured by the display.

14. The robot system according to claim 1, wherein
the work contents information includes an explanatory description of the work performed in the image information being displayed simultaneously with the work contents information.

15. A robot monitoring device, comprising
a circuit configured to control a robot so as to perform work in accordance with work contents information preliminarily stored to indicate a series of work contents, configured to save image information captured by an imaging device during work performance by the robot in association with time information, and configured to display the image information saved by the saving module together with the time information, wherein
the circuit is configured to save the image information in association with the work contents information, and sequentially display the image information simultaneously with the work contents information as a moving image.

16. The robot monitoring device according to claim 15, wherein the work contents information includes an explanatory description of the work performed in the image information being displayed simultaneously with the work contents information.

17. A robot monitoring method, comprising steps of:

controlling a robot so as to perform work in accordance with work contents information preliminarily stored to indicate a series of work contents;

saving image information captured by an imaging device during work performance by the robot in association with time information; and displaying the image information saved in the saving step together with the time information, wherein the image information is saved in association with the work contents information when saving the image information, and the image information is sequentially displayed simultaneously with the work contents information as a moving image when displaying the image information.

18. The robot monitoring method according to claim 17, wherein the work contents information includes an explanatory description of the work performed in the image information being displayed simultaneously with the work contents information.

* * * * *